United States Patent [19]

Daniels et al.

[11] 4,409,671

[45] Oct. 11, 1983

[54] DATA PROCESSOR HAVING SINGLE CLOCK PIN

[75] Inventors: R. Gary Daniels, Round Rock, Tex.; Thomas H. Bennett, Scottsdale, Ariz.; Fuad H. Musa, Austin; Michael F. Wiles, Round Rock, both of Tex.

[73] Assignee: Motorola, Inc., Schaumburg, Ill.

[21] Appl. No.: 295,912

[22] Filed: Aug. 24, 1981

Related U.S. Application Data

[63] Continuation of Ser. No. 939,722, Sep. 5, 1978, abandoned.

[51] Int. Cl.³ .................................................. G06F 1/04
[52] U.S. Cl. .................................... 364/900; 307/269
[58] Field of Search ... 364/200 MS File, 900 MS File; 307/269; 328/62, 63; 365/191, 233

[56] References Cited

U.S. PATENT DOCUMENTS

| 3,753,241 | 8/1973 | Bayne | 364/900 |
| 3,757,310 | 9/1973 | Croxon | 364/900 |
| 3,950,654 | 4/1976 | Broedner et al. | 307/208 |
| 3,972,025 | 7/1976 | Taddei | 364/200 |
| 4,086,626 | 4/1978 | Chung | 364/200 |
| 4,095,267 | 6/1978 | Morimoto | 364/200 |
| 4,099,232 | 7/1978 | Mensch, Jr. | 364/200 |

OTHER PUBLICATIONS

"Motorola M6800 Microprocessor Application Manual" 1975, pp. 4-1 to 4-6.
*Digital Design with Standard MSI and LSI*, Blakeslee, 1975, pp. 140-143.
Microprocessors and Microcomputers, Soŭcek, pp. 379-386.
The Design of Digital Systems, Peatman, 1972, pp. 118-120.

*Primary Examiner*—Eddie P. Chan
*Attorney, Agent, or Firm*—Anthony J. Sarli, Jr.; Joe E. Barbee; Jeffrey Van Myers

[57] ABSTRACT

A microprocessor on a monolithic integrated circuit is provided having a single clock input pin for receiving a clock input signal. The clock input signal is used to gate address data onto the address bus and to enable a data input dynamic latch. In addition the input clock signal is used to generate two complementary non-overlapping clock signals used for synchronizing purposes within the microprocessor.

1 Claim, 1 Drawing Figure

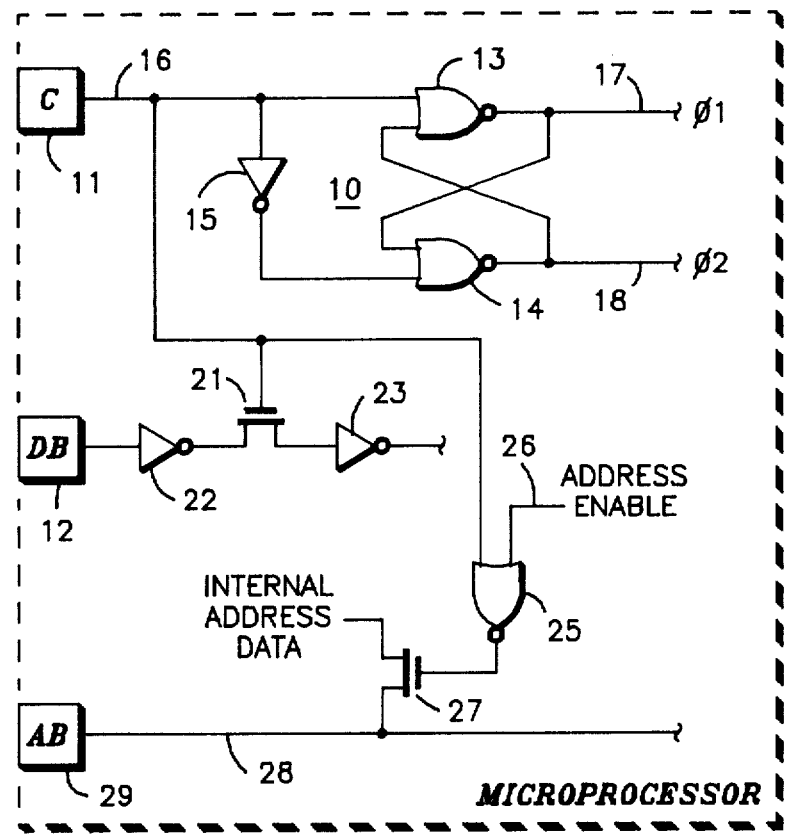

DATA PROCESSOR HAVING SINGLE CLOCK PIN

This is a continuation of application Ser. No. 939,722, filed on Sept. 5, 1978, now abandoned.

A related application is co-pending application entitled "Microprocessor Having Plural Internal Data Buses", now U.S. Pat. No. 4,266,270, by Daniels, Wilder, Musa, Wiles, and Bennett which is assigned to the same assignee as the present application.

BACKGROUND OF THE INVENTION

This invention relates, in general, to data processors which are made on a monolithic integrated circuit, and more particularly, to data processors having a single input clock signal.

In the past many monolithic integrated circuit chips having microprocessors or data processors provided two external pins for connection to an external crystal or oscillator. From the input, on these two external pins internal circuitry generated non-overlapping clock signals which were used for synchronization purposes within the integrated circuit. In addition one of the nonoverlapping clock signals was connected to yet a third external pin so that external peripheral devices coupled to a monolithic integrated circuit could use the signal on this third external pin for synchronizing purposes.

As data processor circuits become more complex it is desirable to have more data processing type of signals on interface pins of the monolithic integrated circuit chip but yet not to increase the number of external pins. Increasing the number of external pins generally tends to increase the physical size of the integrated circuit chip and could result in the monolithic integrated circuit chip being in a non-standard package. One way to decrease the number of external pins provided for clock signals would be to integrate the oscillator as part of the monolithic chip, however, crystals are usually required for high accuracy oscillators and cannot be integrated as part of a monolithic integrated circuit chip. The disadvantages of making a clock frequency generating circuit as part of the monolithic integrated circuit are that the cost of the chip would be increased and the end user of the chip could not easily control the clock frequency. The end user generally wants control of the clock frequency for purposes such as controlling slow memories.

Accordingly, it is an object of the present invention to provide a monolithic integrated circuit chip having a microprocessor and only requiring a single interface pin for receiving a clock input signal.

SUMMARY OF THE INVENTION

In carrying out the above and other objects of the invention, in one form thereof, there is provided a monolithic integrated circuit chip having a microprocessor and requiring only a single clock input sigal. The integrated circuit has one external pin for receiving the single clock input signal, means for generating a first and a second complementary clock signals wherein the first and second clock signals are non-overlapping, and also has a plurality of input data latches for latching input data and being gated by the single clock input signal thereby substantially eliminating skew problems.

BRIEF DESCRIPTION OF THE DRAWINGS

The single FIGURE illustrates a logic diagram for a portion of a microprocessor circuit contained on a monolithic integrated circuit.

DESCRIPTION OF THE PREFERRED EMBODIMENT

An integrated circuit chip having a microprocessor contains many interface or external pins. Two of such pins are illustrated in the single FIGURE. Pin 11 receives a single clock input signal which is coupled by line 16 to circuitry 10. Circuitry 10 serves as means for generating complementary non-overlapping clock signals $\phi1$ and $\phi2$. The input clock signal on line 16 is connected to an input of logic gate 13 and to the input of inverter 15. The output of inverter 15 is connected to an input of logic gate 14. Logic gates 13 and 14 are illustrated as interconnected NOR gates forming a toggle. An output of gate 13 is connected to a second input of gate 14 and the output of gate 14 is connected to a second input of gate 13. Logic gate 13 provides an output, $\phi1$, on line 17 while logic gate 14 provides an output, $\phi2$, on line 18. The two outputs $\phi1$ and $\phi2$ are used for clocking and synchronization purposes by other portions of the microprocessor which are not shown for purposes of simplicity. One such microprocessor is disclosed in the hereinbefore mentioned related U.S. Pat. No. 4,266,270 which is hereby incorporated herein by reference.

The clock input signal on line 16 is also connected to a gate electrode of a field effect transistor 21. Field effect transistor 21 along with inverters 22 and 23 form a dynamic data input latch. Pin 12 is illustrated as being a data bus interface pin for the microprocessor. Typically the microprocessor would contain many data bus pins, however, for the sake of simplicity, which does not detract from understanding the present invention, all of such pins are not illustrated. Data bus pin 12 is connected to an input of inverter or buffer 22 whose output is coupled by field effect transistor 21 to the input of inverter 23. The output of inverter 23 provides the data received on pin 12 to the internal circuitry of the microprocessor by way of an internal bus. In most cases pin 12 will be connected to some external device which is supplying data to the microprocessor. Buffer 22 couples the input data into the microprocessor. If a clock signal received on pin 11 is a logic level high, transistor 21 will be enabled thereby coupling the data into inverter 23. As the clock signal on pin 11 goes low, transistor 21 is disabled thereby momentarily latching the data at the input of inverter 23.

The input clock signal on line 16 also goes to an input of logic gate 25. Logic gate 25 is illustrated as a NOR gate having a second input 26. Typically input 26 would contain information used to enable an address output. The output of logic gate 25 is connected to a gate electrode of a field effect transistor 27. Field effect transistor 27 is coupled to an address bus illustrated as line 28. If the complete microprocessor were illustrated it would be seen that many logic gates 25, many transistors 27, and many address bus lines 28 exist, however, for purposes of simplification only one of each is illustrated. Transistor 27 can be used to couple address data of a logic level "1" or a logic level "0" onto line 28. Line 28 in a typical microprocessor system would be coupled to an address bus pin 29 which would be used to interface with an external device. When the input clock signal on pin 11 is a logic level "1", the output of logic gate 25 is forced to a logic level "0" thereby disabling field effect transistor 27. As soon as the input clock signal on pin 11 goes to a logic level "0" then the output of logic gate 25 is determined by the input on line 26.

By now is should be appreciated that the single clock input on pin 11 is used to provide complementary non-overlapping clock signals $\phi 1$ and $\phi 2$, provide a latch enabling signal for receiving input data which latches the input data at the last instant in time before the input clock signal changes levels, and is used to gate data onto the address bus. By using the input clock signal to enable the data input buffers, they are controlled by the input clock signal itself, instead of being controlled by some other internal generated clock signal. An internally generated clock signal would have a delay induced by logic gates and inverters which are used to generate the internal clock signal. Using the input clock signal itself avoids skew problems which could arise because of the difference in timing between the input clock signal and the internally generated clock signals. Skew problems are also avoided on gating the output address signal by using the input clock signal directly. This permits the output address to be gated at the last possible instance and yet not be subject to skew problems.

An additional advantage achieved by the present invention and not discussed hereinbefore is that the circuit generating the input clock signal can be an inexpensive circuit since the rise time is not critical. It is the trailing edge of the input clock signal which must drop faster than the rising edge of the input clock signal since it is the trailing edge which is used to do the critical gating or enabling.

It should also be noted that in monolithic integrated circuit chips having large capacitance on line 17 and 18 that circuitry 10 may be modified so that the toggle will switch sharper thereby compensating for the addition of the capacitance on line 17 and 18.

What is claimed is:

1. A monolythic integrated circuit microprocessor comprising:
   a single clock input terminal for receiving an externally generated clock signal which changes between first and second states at a predetermined frequency;
   timing signal generating means coupled to the single clock input terminal, for generating first and second complementary, non-overlapping timing signals having substantially the same frequency as said clock signal but delayed relative thereto by first and second predetermined skews, respectively;
   at least one data input terminal for receiving an externally generated input data signal;
   input gating means coupled to the single clock input terminal and to the one data input terminal, for latching the state of the input data signal in response to said clock signal changing from a selected one of said states to the other of said states;
   at least one address output terminal for providing an internally generated output address signal; and
   output gating means coupled to the single clock input terminal and to the one address output terminal and responsive to an internally generated address enable signal, for selectively coupling the internally generated output address signal to the one address output terminal in response to the clock signal changing to said selected one of said states from the other of said states;
   whereby the microprocessor latches the state of the input data signal and provides the output address signal with minimum skew relative to the clock signal.

* * * * *